United States Patent [19]
Bergamini

[11] 3,707,980
[45] Jan. 2, 1973

[54] DUAL REGULATOR PNEUMATIC CONTROL SYSTEM HAVING AUTOMATIC ALIGNMENT MEANS FOR CASCADE AND MANUAL OPERATION

[75] Inventor: Giorgio Bergamini, Bari, Italy
[73] Assignee: Pignone Sud S.p.A, Bari, Italy
[22] Filed: Nov. 6, 1970
[21] Appl. No.: 87,498

[30] Foreign Application Priority Data
Nov. 8, 1969 Italy..................62099 A/69

[52] U.S. Cl. ..................137/84, 137/85, 137/86, 137/DIG. 1
[51] Int. Cl. ..............................G05d 16/00
[58] Field of Search.............137/86, 85, 84, DIG. 1

[56] References Cited

UNITED STATES PATENTS 3,126,903  3/1964  Hart......................137/84
2,969,080  1/1961  Marnzic...................137/84

Primary Examiner—Alan Cohan
Attorney—Ralph M. Watson

[57] ABSTRACT

A system is described for connecting two force equilibrium pneumatic balance regulators, adapted to be actuated by a pair of variables, so that those regulators can be operated in cascade or manually and the operation can be readily changed at will from cascade to manual, and vice versa, without causing jumps in the output pressure of the system; whereby, during manual operation, the output of an amplifier-relay of the primary regulation is utilized as a set value for the secondary regulator whereas, during manual operation, a secondary variable is used as set value for the secondary regulator, and the manual outlet of the two cascade regulators is connected directly to the positive reaction of the secondary regulator.

12 Claims, 3 Drawing Figures

DUAL REGULATOR PNEUMATIC CONTROL SYSTEM HAVING AUTOMATIC ALIGNMENT MEANS FOR CASCADE AND MANUAL OPERATION

The present invention relates to circuit diagrams for the cascade connecting of two pneumatic regulators by means of which in the commutations an automatical alignment and therefore an easy and fast regulation of a plant is possible. In detail, the invention provides circuit diagrams for the cascade connection of two regulators so as to make possible the commutation MANUAL CASCADE and the commutations MANUAL $\rightleftarrows$ AUTOMATIC of the primary regulator of the cascade and EXCLUSION $\rightleftarrows$ INCLUSION of the secondary regulator without jumps of pressure in the commutations and therefore in the outlet pressure of the combination of the two regulators.

Use is made of two regulators every time that in regulating a variable $V_1$ (temperature, pressure, level, flow, density and so on), specific for a plant, it is required to take into account a second variable $V_2$ strictly depending on $V_1$ in the process. The cascade connection consists in sending simply the outlet of the primary regulator as a reference or set value of the secondary regulator, whereas the outlet of the combination of the two regulators is the one of the secondary regulator.

In regulating a plant it is often required to vary the parameters under control, this meaning after all to carry out commutations in the system of the two regulators connected in cascade. The most required commutations are the ones allowing to pass from a manual running to an automatic running (cascade) and the ones allowing the running in manual condition or the running in automatic condition of the primary regulator with the secondary regulator excluded and the running in automatic condition of the primary regulator with the secondary regulator included (running in cascade). On the contrary the commutation INCLUDED $\rightarrow$ EXCLUDED of the secondary regulator, when the primary regulator runs in automatic condition, must be barred as corresponding to a non-aligning situation and therefore producing pressure jumps in commutation, as the outlet of the primary regulator cannot be equal to the one of the secondary regulator, but accidentally. The disposition too primary regulator in MANUAL and secondary regulator INCLUDED must be barred as not aligning.

Now, in the system with pneumatic regulators connected in cascade according to the prior art the above said commutations may be effected only after an involved manual alignment of the pressure in commutation, this requiring the work of a skilled operator, his constant tiresome attention and long periods before reaching the necessary conditions for a commutation without jumps.

Object of the present invention is the removal of said drawbacks and the realization therefore of cascade connections of two regulators by which the two regulators be always self-aligned so that the commutations might be carried out quickly, in an easy way and without errors even on the side of a simple operator.

In the present invention use is made of pneumatic regulators of the kind specified in another of our patent applications (Italian patent application No. 17501 A/69 filed on May 28, 1969 and my corresponding U.S. patent application, Ser. No. 87,472, filed on even date herewith) comprising a force equilibrium pneumatic balance, a system nozzle-flapper piloting an amplifier relay and a variable slope ramp generator for the manual setting of the pressure value interconnected by means of a variable polarization integral reverser, a repeater-amplifier 1:1 and commutators so as to realize a circuit diagram with an automatic alignment in the commutation AUTOMATIC – MANUAL.

The coupling of two regulators, such as the outlet of the primary regulator is sent as a reference or set value of the secondary regulator, would allow therefore already the automatic alignment of the two regulators in cascade without jumps in the commutating pressures during the commutation MANUAL $\rightleftarrows$ CASCADE.

Object of the present invention is the realization of a further circuit diagram for connecting in cascade two pneumatic regulators which, allowing the elimination of some components in comparison with the above said coupling, allows a higher structural simplicity and economy.

This is achieved by eliminating the variable slope ramp generator and the repeater-amplifier 1:1 in the diagram of the first regulator (primary regulator), the variable polarization integral reverser in the diagram of the second regulator (secondary regulator) and sending the secondary variable $V_2$, in the running in MANUAL, both to polarize the variable polarization integral reverser of the primary regulator and as a set value at the inlet of the secondary regulator, whereas the manual outlet of the secondary regulator is sent directly to the bellows the positive reaction, the bellows of the negative reaction being fed by the outlet of the amplifying relay of the secondary regulator. In this way, in fact, whereas the secondary regulator is kept perfectly aligned operating as a repeater with a zero inlet error, the primary regulator, although with an inlet error between the primary value $V_1$ and the set value, is always ready to be commutated giving at its outlet $V_2$, i.e. just the value of the pressure to be given in order there are no pressure jumps during the commutation.

According to the present invention it is also shown a circuit diagram for connecting in cascade two pneumatic regulators with a system of automatic alignment in the commutation MANUAL $\rightleftarrows$ CASCADE, suitable when the two regulators are not adjacent but the secondary regulator is in field and the primary one is in the control room. Said circuit diagram is not substantially different from the preceding one but for the fact that, being required in the control room the manual unit comprising the amplifier repeater 1:1 and the variable slope ramp generator of the secondary regulator, it is foreseen an actuator remote-controlled by a commutator with three ways and two positions, for telecommutating the commutators of the secondary regulator and for the fact that between the outlet of the primary regulator and the set pressure chamber of the secondary regulator is interposed a further commutator with three ways and two positions which, fed in one of the two positions by the same secondary variable $V_2$ and operated by said actuator, serves to eliminate the delay times of the relevant connection up to the field.

Further scope of the present invention is the realization of a circuit diagram for connecting in cascade two pneumatic regulators which, taking always into account the feature of structural simplicity and economy, allows the automatic alignment in the commutations MANUAL ⇄ AUTOMATIC of the primary regulator and EXCLUDED ⇄ INCLUDED of the secondary regulator.

This is achieved by eliminating the variable slope ramp generator and the repeater amplifier 1:1 in the diagram of the secondary regulator, using always the outlet of the amplifier relay of the primary regulator as a set signal of the secondary regulator and connecting the outlet of the primary regulator both to the manual unit, located in the secondary regulator and formed by a variable slope ramp generator and by a repeater amplifier 1:1, and to the outlet U of the group of the two cascade regulators through a commutator with three ways and two positions, the second position of this latter being connected to the outlet of the amplifier relay of the secondary regulator. In this way, with the secondary regulator EXCLUDED, said commutator either sends the manual outlet pressure U to polarize the variable polarization integral reverser of the primary regulator, if this is in MANUAL running, thereby rendering it aligned for the commutation in AUTOMATIC condition, or transmits to the outlet U of the group the outlet of the primary regulator, if this is in AUTOMATIC running. If on the contrary the secondary regulator is INCLUDED, said commutator transmits to the outlet U of the group the outlet of the amplifier relay of the secondary regulator.

According to a distinctive feature of the invention, in the above said diagram of cascade connection, it is foreseen a system of mechanical interlock of the different commutators which, although permitting said commutations, prevents anyhow the non-aligning commutation INCLUDED → EXCLUDED of the secondary regulator with the primary one in AUTOMATIC condition and the non-aligning arrangement of primary regulator in MANUAL condition and secondary regulator INCLUDED.

The invention is now specified in detail with reference to the enclosed drawings showing a preferred embodiment given only by way of example, as technical, structural and circuit variants may be in practice thought without departing from the range of the present invention.

Everywhere A indicates the feeding of the single components and S the discharge into atmosphere.

Figure 1:
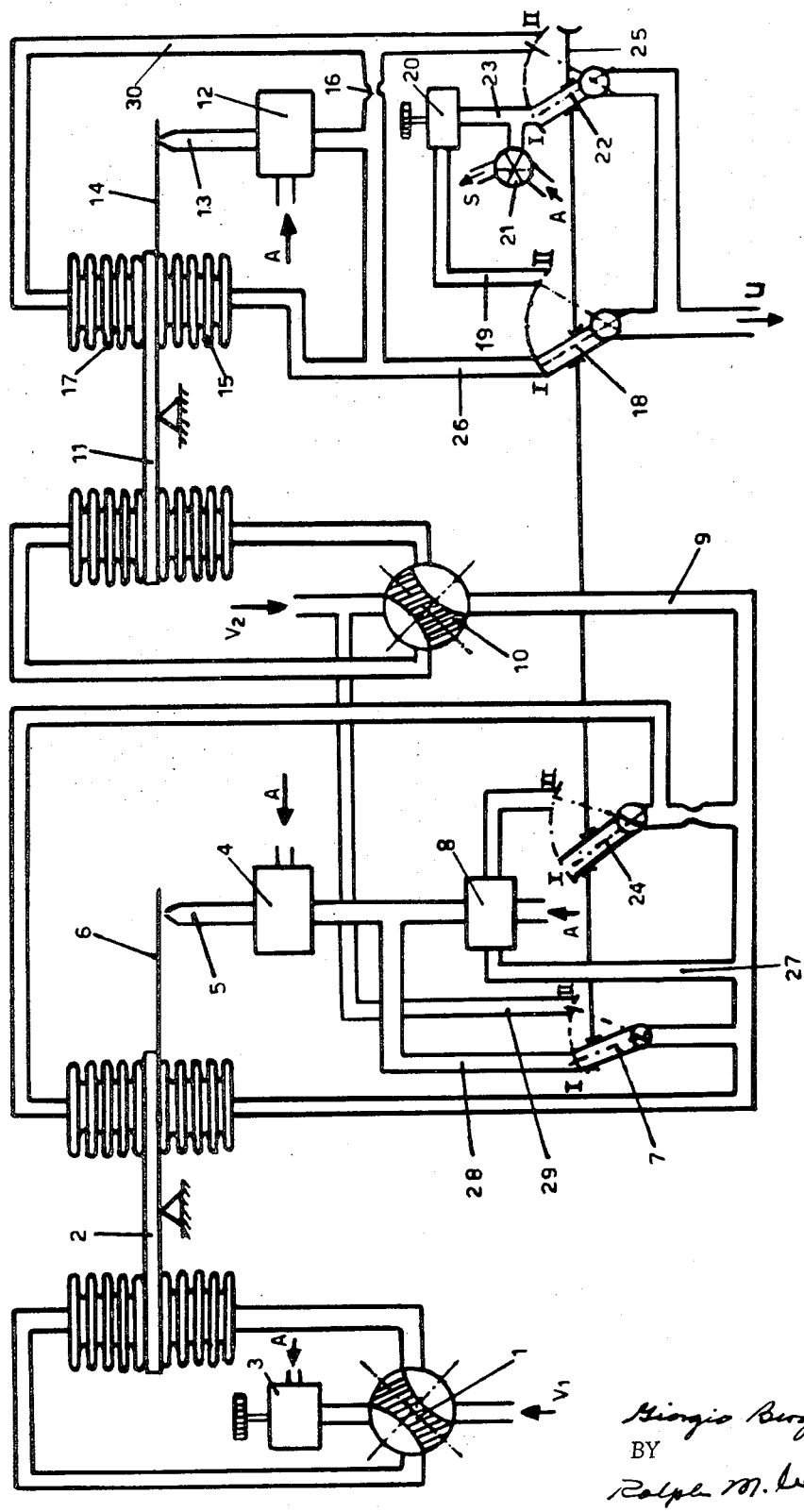
FIG. 1 shows the circuit diagram for connecting in cascade two pneumatical regulators with a system of automatical alignment in the commutation MANUAL⇄CASCADE, according to the invention.

With reference to FIG. 1 it is possible to see that the main variable to be controlled $V_1$ is sent, through deflector 1, to a bellows of a force equilibrium pneumatic balance 2 of the primary regulator, whereas to the opposite bellows is sent the required pressure value set through manually adjustable pressure generator 3 (SET). The outlet of amplifier-relay 4, operated by system nozzle 5 – flapper 6, is sent to a commutator 7, having three ways and two positions, and to the inlet of variable polarization integral reverser 8 respectively, these latter being connected in the circuit of the primary regulator according to the diagram shown in the mentioned Italian Patent Application No. 17501 A/69 and my corresponding U.S. patent application, Ser. No. 87,472. Outlet duct 9 of the primary regulator, contrary to what occurs in said patent application, is connected to no manual group but, through deflector 10, directly to a bellows of force equilibrium pneumatic balance 11 of the secondary regulator, in the opposite bellows of which is sent the secondary variable $V_2$ which, according to a distinctive feature of the present invention, is sent moreover to above-mentioned commutator 7. The outlet of amplifier-relay 12 of the secondary regulator, said relay being operated by the system nozzle 13 – flapper 14, feeds, on the contrary, directly the bellows of negative reaction 15 and, through narrowing 16, the bellows of positive reaction 17 and is furthermore sent to the outlet U through commutator 18 having three ways and two positions. To this latter it is connected to outlet 19 of repeater amplifier 20 of the manual group comprising variable slope ramp generator 21, whereas commutator 22 with three ways and two positions allows to convey the outlet pressure U either to polarization duct 23 of repeater amplifier 20 or directly to the bellows of positive reaction 17.

The four commutators 7, 24, 18 and 22 with three ways and two positions are rigidly interconnected and operated by means of a single lever 25. If the commutators are in position I we have the CASCADE regulation, if they are in position II we have MANUAL regulation.

That with such a circuit diagram there are no pressure jumps in the commutation it results clear by remarking that in CASCADE running, i.e. with commutators in position I (as in FIG. 1), the outlet pressure U, i.e. the pressure in duct 26, conveyed through commutator 22 into duct 23, polarizes the repeater amplifier 20 which gives thereby in its outlet duct 19 a pressure equal to the one of polarization, i.e. to the pressure in duct 26. As commutator 18, passing from position I (CASCADE) to position II (MANUAL), feeds outlet U, rather than with the outlet pressure of relay 12, i.e. with the pressure of duct 26, with the pressure of duct 19, it is clear that the commutation CASCADE → MANUAL occurs without jumps of the outlet pressure. In a like way, in MANUAL running, i.e. with commutators in position II, commutator 7 sends the secondary variable $V_2$ as a set value to the inlet of the secondary regulator and to polarize, through duct 27, variable polarization integral reverser 8 which will thus establish in duct 28 a pressure equal to $V_2$.

On the other hand the secondary regulator, having in both opposite inlet bellows the same pressure $V_2$, i.e. no inlet error, acts as a repeater, and therefore the value of the outlet manual pressure U, which is conveyed into bellows 17 through commutator 22, will establish too in bellows 15 and therefore in duct 26.

Given that in such a way in ducts 28 and 29, 26 and 19, 23 and 30 there are similar pressure value, it is evident the commutation MANUAL → CASCADE, i.e. the change-over of the commutators from position II to position I, will occur with no pressure jumps.

It is finally to notice that, since the secondary regulator operates as a repeater during the MANUAL regulation, there is no more the need of connecting the outlet of amplifier-relay 12 to a variable polarization integral reverser for reaching the pressure alignment.

Figure 2:
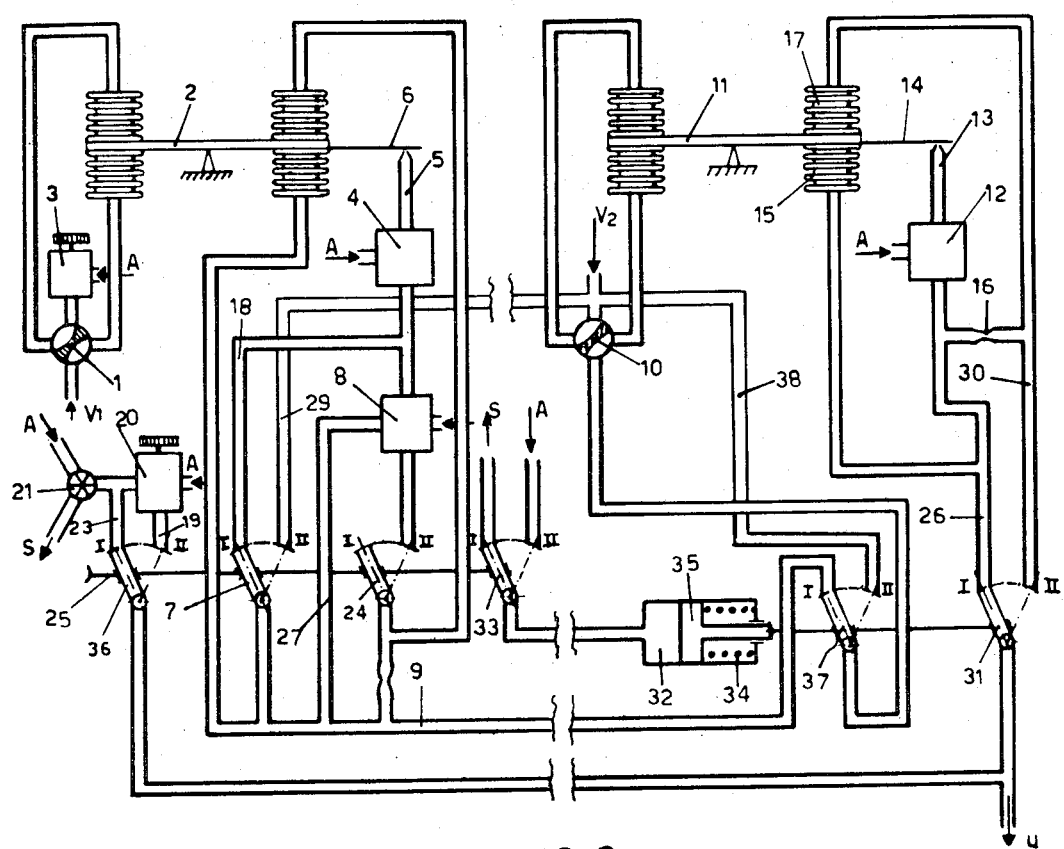
FIG. 2 shows the circuit diagram for connecting in cascade two pneumatical regulators with a system of automatical alignment in the commutation MANUAL⇄CASCADE in the case of regulator in field, according to the invention.

The circuit diagram of FIG. 2 is roughly similar to the one of FIG. 1 and therefore use is made of the same numbering for marking corresponding elements. Said circuit diagram differs only because, being the secondary regulator in field, i.e. far from the primary regulator located on the contrary in the control room together with the manual unit comprising repeater amplifier 20 and variable slope ramp generator 21, an actuator 32, remote-controlled by commutator 33 having three ways and two positions, is foreseen from the telecommutation of commutator 31 of the secondary regulator, said commutator presenting three ways and two positions and changing over outlet U from duct 26 to duct 30 and vice versa.

Said actuator is simply formed by a cylinder, wherein a piston 35, rigidly connected to commutator 31, is slidable inserted and fed back by a spring 34. The remote-controlled commutator 33 of actuator 32 is then rigidly connected to commutators 24 and 7 and to commutator 36 changing over from polarization duct 33 of repeater amplifier 20 to outlet duct 19 of the same repeater amplifier and vice versa.

All these commutators present three ways and two positions and are operated by means of a single lever 25.

The outlet 9 of the primary regulator is not furthermore directly connected to the set chamber of the secondary regulator, but through a commutator with three ways and two positions 37, to the second position of which the same secondary variable $V_2$ is piped by means of duct 38. Said commutator, rigidly connected to commutator 31 and therefore operated by abovementioned actuator 32, is a repeater of commutator with three ways and two positions 7 and serves to eliminate the delay times of the respective connection up to the field wherein the secondary regulator is located. The working is obvious. When the primary regulator is, e.g. led on from the CASCADE-regulation to the MANUAL-regulation by changing over commutators 36, 7, 24 and 33 from position I to position II, actuator 32 is fed through commutator 33 by a feeding pressure A which overcomes the feedback of spring 34, moves on the right piston 35 and obliges in such a way also commutators 37 and 31 of the secondary regulator to change over from position I (CASCADE) to position II (MANUAL).

Figure 3:
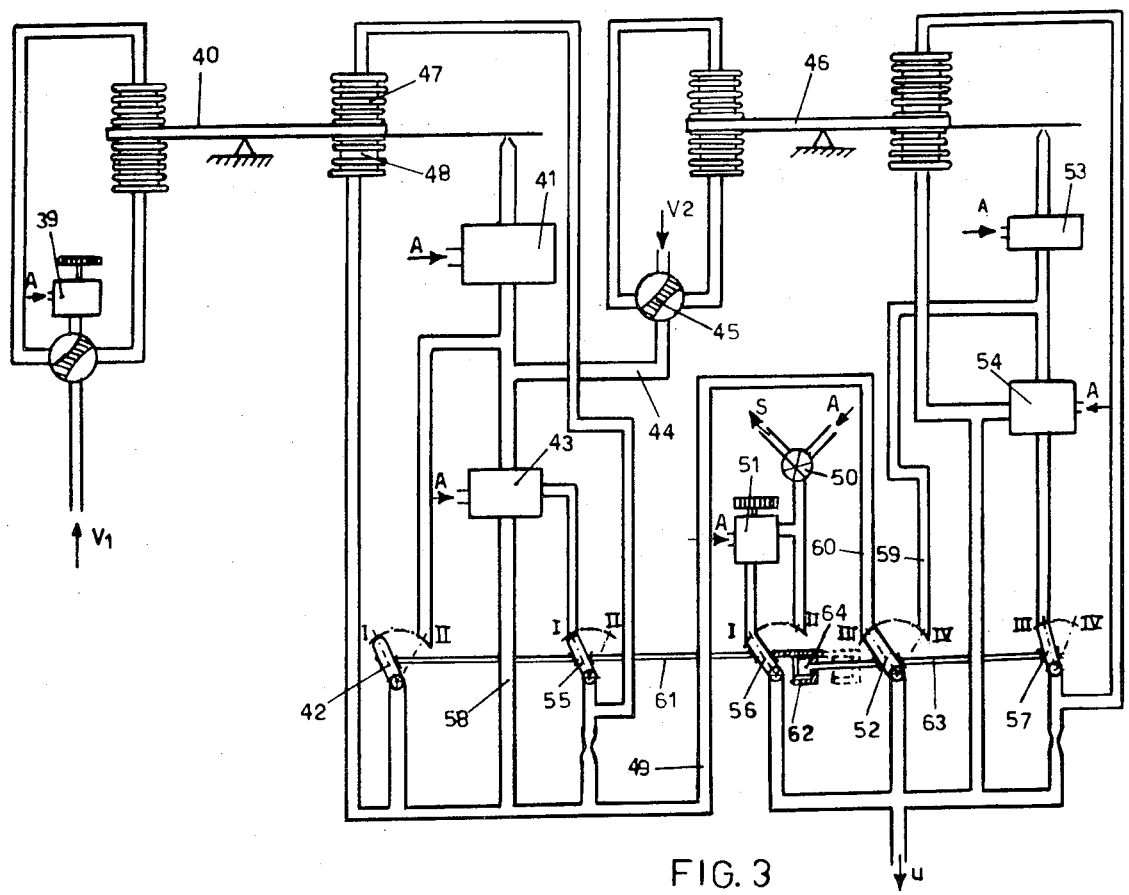
FIG. 3 shows the circuit diagram for cascade connecting two pneumatic regulators with a system of automatical alignment in the commutations MANUAL ⇄ AUTOMATIC of the primary regulator and EXCLUDED ⇄ INCLUDED of the secondary regulator, according to the invention.

Referring finally to FIG. 3, wherein the main variable $V_1$ and the set-value, manually imposed by means of pressure generator 39, as compared as usual in the two opposed bellows of the force equilibrium pneumatic balance 40 of the primary regulator, we have that the outlet of amplifier-relay 41 is sent not only to commutator with three ways and two positions 42 and to the inlet of variable polarization integral reverser 43 but also, according to a distinctive feature of the invention, through duct 44 and deflector 45 into a bellows of the force equilibrium pneumatic balance 46 of the secondary regulator, into the opposed bellows of which is sent the secondary variable $V_2$.

The above-mentioned commutator 42 and the variable polarization integral reverser 43 are then connected to bellows 47 of the positive reaction and to bellows 48 of the negative reaction of the primary regulator according to the diagram explained in the already cited Italian patent application No. 17501 A/69 and my corresponding U.S. patent application, Ser. No. 87,472.

Outlet duct 49 of the primary regulator is not directly connected to outlet U and to manual unit, inserted into the circuit of the secondary regulator and formed by variable slope ramp generator 50 and by repeater amplifier 51, but through a commutator with three ways and two positions 52 to which it is also connected the outlet of amplifier-relay 53 of the secondary regulator.

Said relay 53 and the variable polarization integral reverser 54 are connected to the circuit of the secondary regulator according to the diagram explained in the already cited Italian patent application No. 17501 A/69 and my corresponding U.S. patent application, Ser. No. 87,472.

Commutators with three ways and two positions 42, 55 and 56 carry out in the positions I and II respectively the MANUAL- and the AUTOMATIC working of the primary regulator, whereas commutators with three ways and two positions 52 and 57 carry out in the positions III and IV respectively the EXCLUDED- and INCLUDED- conditions of the secondary regulator.

Above-mentioned commutator with three ways and two positions 52 fulfills a triple function. With the secondary regulator in EXCLUDED condition, said commutator transmits to outlet U the outlet of the primary regulator when this is in AUTOMATIC working, or sends the outlet manual pressure U, imposed by means of the manual unit, into duct 58 to polarize variable polarization integral reverser 43 of the primary regulator when this is in MANUAL working, aligning in such a way said regulator for the commutation in AUTOMATIC working; with the secondary regulator in INCLUDED condition, said commutator transmits on the contrary to outlet U the outlet of amplifier-relay 53, the alignment of the secondary regulator being ensured by variable polarization integral reverser 54 the action of which is such that in duct 59 there is always a pressure like to the one existing in duct 60. All the commutators with three ways and two positions 42, 55, 56, 52 and 57 are then interconnected by means of a mechanical restraint which, allows the above-said workings but nevertheless excludes the possibility of the non-aligning commutation INCLUDED → EXCLUDED of the secondary regulator with the primary regulator in AUTOMATIC working and the non-aligning condition wherein the primary regulator is in MANUAL working and the secondary regulator in INCLUDED condition.

Said mechanical restraint is obtained by interconnecting simply three commutators 42, 55 and 56 of the primary regulator by means of a stay wire 61 presenting at its end an open box 62 into a hole of the bottom of which it is inserted stay wire 63 controlling commutators 52 and 57 of the secondary regulator. In this way box 62, containing and making inaccessible knob 64 of stay wire 63, presents the non-aligning commutations.

In fact, starting from the conditions wherein the primary regulator is in MANUAL running and the secondary regulator in EXCLUDED condition, as shown in FIG. 3, it is evident no commutation from EXCLUDED-to INCLUDED condition is possible for the secondary regulator as knob 64 is inaccessible.

It is therefore precluded the mistake of a non-aligning commutation EXCLUDED → INCLUDED of the secondary regulator, the primary regulator being in MANUAL running. The only possible commutation is the one of the primary regulator from MANUAL to AUTOMATIC running, shifting on the right box 62 (position dashed in FIG. 3). At this point knob 64, emerging from box 62, is accessible and therefore the commutation EXCLUDED → INCLUDED of the secondary regulator can be made. Now, with the primary regulator in AUTOMATIC working and with the secondary regulator in INCLUDED condition knob 64 is again inaccessible and it is therefore precluded the mistake of the non-aligning commutation INCLUDED→ EXCLUDED of the secondary regulator, when the primary regulator is in AUTOMATIC working. It is on the contrary possible the commutation AUTOMATIC → MANUAL of the primary regulator, shifting on the left box 62, but simultaneously and automatically it takes place also the commutation INCLUDED → EXCLUDED of the secondary regulator as knob 64 is dragged by box 62. It is precluded thereby the possibility of the non-aligning condition wherein the primary regulator is in MANUAL working and the secondary regulator is INCLUDED condition.

What we claim is:

1. A pneumatic control system comprising:
   first and second pneumatic regulators each having an output, inputs for applying thereto a pneumatic variable and a pneumatic reference pressure, and a reaction input, the first regulator receiving at one of its inputs a first pneumatic variable;
   variable pneumatic reverser means jointly responsive to the output of the first regulator applied to a first input thereto and to the primary system pressure at a second input thereto for producing an output representing a discrepancy therebetween; and
   commutator means adapted to receive a second pneumatic variable and being operable to supply the first regulator output and the second pneumatic variable to the reference input of the second regulator for cascade and manual operation, respectively, thereof,
   the commutator means further being operable to supply the output of the reverser means to the reaction input of the first regulator during manual operation.

2. The pneumatic control system of claim 1, wherein:
   the first and second regulators include a force balance each having a positive and negative reaction inputs, the positive reaction input of the first regulator being supplied by the pressure selected by the commutator means.

3. The pneumatic control system of claim 2, wherein:
   each of the regulators includes an amplifier-relay providing a regulator output, and a nozzle-flapper controlling the amplifier-relay.

4. The pneumatic control system of claim 1, further comprising:
   means for manually establishing a reference pressure,
   the commutator means being operable to supply the system under control and the reaction input of the second regulator with the reference pressure during manual operation.

5. The pneumatic control system of claim 4, wherein:
   the means for manually establishing the reference pressure includes a linear pressure setting means and a pneumatic repeating amplifier supplied thereby.

6. The pneumatic control system of claim 1, further comprising:
   second commutator means for supplying the variable input of the second regulator with the output of the first regulator and the second variable during cascade and manual operation, respectively;
   an actuator connected to operate the second commutator means; and
   actuator commutator means operable by the first commutator means for supplying and energizing pressure to the actuator during cascade operation.

7. The pneumatic control system of claim 6, wherein:
   the actuator is remotely controlled and includes a pneumatic cylinder having a piston resiliently biased in a deactivated position when the first commutator means selects manual operation.

8. The pneumatic control system of claim 6, further including:
   manual regulating means having an output; and
   second regulator commutating means operated by the actuator for supplying to the reaction input of the second regulator the output of the manual regulating means during manual operation.

9. A pneumatic control system comprising:
   a primary regulator having reference, variable and reaction inputs and an output;
   a secondary regulator having as inputs a reference pressure and the output of the primary regulator and a reaction input, and providing an output;
   an interconnecting conduit between the primary and secondary regulators;
   a first pneumatic reverser responsive to the primary regulator output and to the pressure in the interconnecting conduit to produce a reaction pressure;
   a second pneumatic reverser responsive to the secondary regulator output and the pressure of the system to be regulated to provide a reaction pressure;
   manual regulating means;
   first commutating means for coupling the reaction pressure of the first reverser to the reaction input of the first regulator during manual operation and for coupling the first regulator output to the interconnecting conduit during automatic operation, the first commutating means coupling the manual regulating means to the system to be controlled during manual operation; and
   second commutating means operable to couple the interconnecting conduit to the system to be controlled and to supply the second regulator output to the reaction input of such regulator when such regulator is to be operatively excluded from the system and for coupling the output of the second regulator to the system being controlled during operation of the system including said second regulator.

10. The pneumatic control system of claim 9, wherein:
the second commutating means is operable to connect the output of the second reverser to the reaction input of the secondary regulator during operatively excluded operation of such regulator and for disconnecting the output of such reverser from the reaction input of the secondary regulator when said regulator is operatively included in the system.

11. The pneumatic control system of claim 9, further comprising:
commutator restraint means interactive with said first and second commutator means for precluding commutation to the combined modes of (a) manual operation with the secondary regulator included and (b) automatic operation with the secondary regulator excluded.

12. The pneumatic control system of claim 11, wherein the commutator restraint means includes:
an open box movable with the first commutating means having a hole therein; and
a movable element associated with the second commutator means and translatable in a common direction therewith, said element extending through the hole of the box associated with the first commutator means.

* * * * *